Patented Nov. 4, 1930

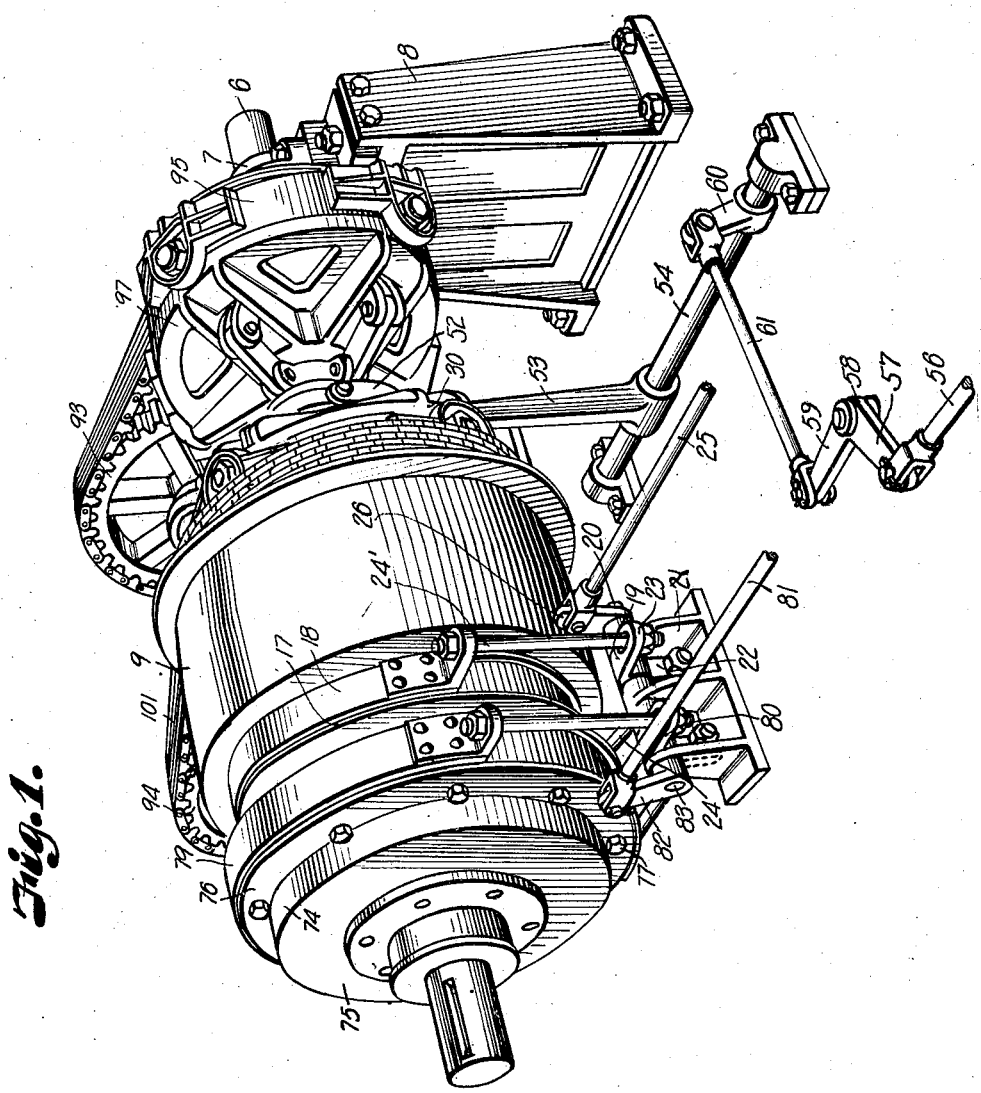

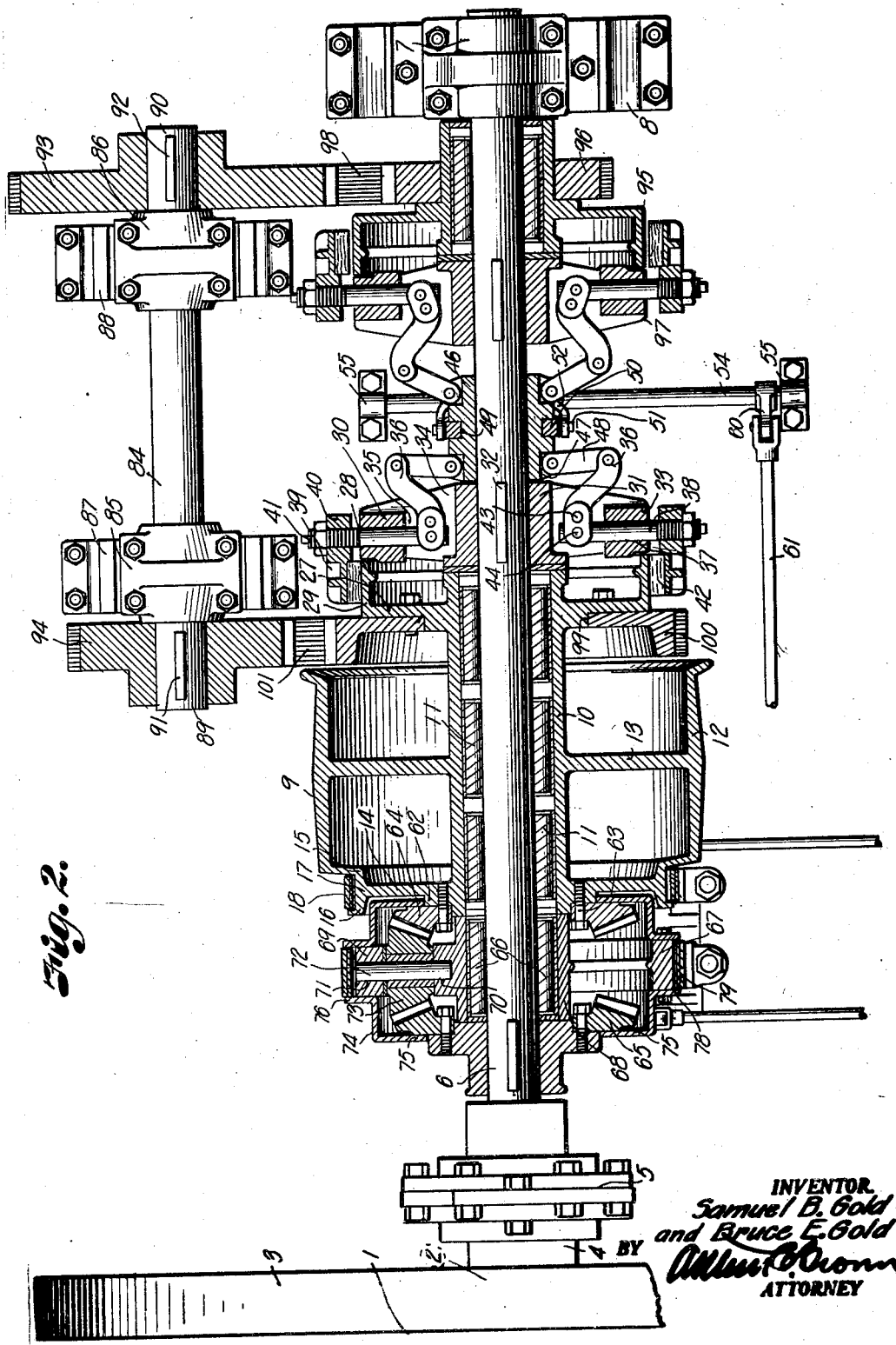

1,780,475

UNITED STATES PATENT OFFICE

SAMUEL B. GOLD AND BRUCE E. GOLD, OF KANSAS CITY, MISSOURI, ASSIGNORS TO WEBER ENGINE COMPANY, OF KANSAS CITY, MISSOURI, A CORPORATION OF IOWA

VARIABLE-SPEED TRANSMISSION

Application filed October 20, 1928. Serial No. 313,755.

Our invention relates to power transmitting mechanism and more particularly to apparatus of that character for transmitting the power of a prime mover to variable working loads; the principle objects of the invention being to provide a transmission whereby the prime mover may be actuated at its normal rated speed and such normal speed transmitted through various selective speeds to meet varying power requirements of the working load.

In accomplishing this and other objects of the invention we have provided improved details of structure, the preferred forms of which are illustrated in the accompanying drawings, wherein:

Fig. 1 is a perspective view of a power transmitting mechanism constructed in accordance with our invention, and Fig. 2 is a central horizontal section through the transmitting mechanism.

Referring more in detail to the drawings by numerals of reference:

1 designates a prime mover such as an ordinary internal combustion engine having a power shaft 2 equipped with a fly wheel 3, the hub 4 of the fly wheel being adapted for connection with our improved power transmitting mechanism now described.

Rotatably mounted in end alignment with the power shaft and connected to the fly wheel hub by a flexible coupling 5 is a shaft 6 having its free outer end rotatably mounted in a bearing 7, supported upon a pedestal 8 which is bolted to an extension of the engine foundation or other suitable support to maintain the shaft 6 in true alignment with the power shaft of the engine.

Rotatably mounted on the shaft 6 and in spaced relation with the coupling 5 is a reversible pulley 9 for delivering power of the prime mover to the working load through various working speeds which, in the present illustration, comprise high and low speed forward and a single speed in reverse. The pulley 9 is provided with an extended hub 10 having an internal bore of larger diameter than the shaft to receive a plurality of roller bearing sets 11. The hub is connected with the rim 12 of the pulley by spokes 13 and an end web 14.

The end web 14 has an offset portion 15 and a lateral flange portion 16 extending from the offset portion to provide a brake drum 17 and working on the drum 17 is a brake band 18 whereby rotation of the pulley may be controlled or completely stopped as when shifting from one speed to another or when changing directions of rotation.

The band 18 may be contracted about the drum by any suitable brake actuating mechanism, such as a bell crank 19, fixed on a shaft 20 pivotally mounted in a bracket 21, the bell crank having a depending arm 22 and a forwardly extending arm 23, which arms are connected with respective ends of the brake band by rods 24 and 24' respectively. The bell crank lever shaft 20 may be rocked by a reciprocatory actuating rod 25 fixed to the end of a lever 26 provided on the shaft 20 so that by shifting the rod forwardly, the bell crank may be rocked to tighten the band about the drum and stop rotation of the pulley.

High speed forward

The hub of the pulley projects beyond the outer side face of the pulley on the side opposite the brake drum, and is provided with a web 27 having a laterally extending peripheral flange 28 constituting a clutch drum 29.

Fixed to the shaft adjacent the clutch drum is a clutch shoe supporting disk 30 comprising a hub 31 splined to the shaft by a key 32 and carrying an integrally cast rim 33 supported from the hub by spokes 34, the spokes having through slots 35 for receiving shoe actuating levers 36. Slidably mounted in openings 37 extending through the rim and into the slots 35 are rods 38, the ends of which extend into the recesses and project from the peripheral face of the rim 33. 39 designates clutch shoes having laterally extending arms 40 threaded into the projecting ends 41 of the rods 38 for adjustably mounting the shoes on the rods.

The shoes 39 are arranged about the clutch drum and are provided with brake blocks 42 for frictional contact therewith.

The actuating levers 36 are substantially S shaped and are pivotally mounted in the slots 35 on pins 43 and the inner ends of the levers are connected by pins 44 with the inner ends of the rods 38.

Slidably mounted on the shaft 6 is a sleeve 46 having ears 48 connected to the free ends of the actuating levers 36. The sleeve 46 is also provided with a peripheral groove 49 for receiving a ring 50 having laterally extending pins 51 for engaging a yoke 52 of a shifting lever 53. The lever 53 is mounted on a rock shaft 54 rotatable in bearings 55 fixed to the transmission foundation and extending at right angles to the power shaft. The rock shaft may be actuated by a reciprocatory rod 56 extending parallel with the brake actuating rod and is connected with an arm 57 of a horizontally mounted bell crank lever 58, the other arm 59 of the bell crank being connected with an arm 60 on the rock shaft by a drag link 61.

Thus when the rod 56 is shifted forwardly, the bell crank is pivoted to rock the shaft 54, causing the arm 53 to shift the sleeve toward the clutch drum, the shifting of the sleeve causing the links 48 to rock the shoe actuating levers to draw the rods inwardly and bringing the clutch shoes into contact with the clutch drum. Since the shoes are carried by the disk 30 which is keyed on the shaft 6 the clutch drum will rotate therewith and drive the pulley at the speed of the shaft or at high speed in a forward direction.

High reverse speed

Fixed to a projecting hub 62 extending from the outer face of the pulley web 14 by bolts 63 is a bevel gear 64 and spaced from the gear 64 is a complementary gear 65 which, together with the gear 64, constitutes respectively the driver and the driven gear of the reversing mechanism now described.

Rotatably mounted between the gears 64 and 65 on roller bearings 66 is a planetary gear carrier 67 comprising a hub 68, bored to receive the bearings, and a rim 69 cast integrally therewith. Fixed in sockets 70 formed in the hub and in aligning openings 71 in the rim are pinion supporting shafts 72 carrying bevel pinions 73 for meshing with the gears 64 and 65 to drive the pulley as later described.

The gearing may be enclosed in a housing 74 comprising cup shaped metal stampings 75 having peripheral flanges 76 for attachment to the planetary gear carrier by bolts 77, the bolts extending through the rim 69 and the flanges 76. The flanges 76 preferably project from the face of the rim to provide a peripheral seat 78 for a brake band 79 extending about the rim and connected at its ends with a bell crank lever 80 which is operated to contract the band by a rod 81 connected with an arm 82 on a shaft 83 that is mounted in the bracket 21 in end alignment with the shaft 20 and actuated in the same manner as the bell crank for the pulley brake band. Thus when the brake band is tightened about the carrier rim, rotation of the gear carrier is stopped, stopping planetation of the pinions 73, which causes the gear 65 to rotate the planet gears on their shafts 72 to drive gear 64 in reverse direction to the gear 65 and to the shaft, and since the gear 64 is fixed to the pulley the pulley is driven reversely and at the same speed as the shaft, giving the reverse speed for the transmission.

Low speed

Located to the rear of the shaft and in parallel relation therewith is a counter shaft 84 which is rotatably mounted in spaced bearings 85 and 86 supported on brackets 87 and 88 that are bolted to the foundation. The ends 89 and 90 of the shaft project through the bearings 85 and 86 and fixed on the respective ends of the shaft, by keys 91 and 92, are sprockets 93 and 94 of different diameter.

Rotatably mounted on the outer end of the shaft 6 is a clutch drum 95 similar in construction to the clutch drum 29 heretofore described, and bolted to the drum is a sprocket wheel 96 positioned in alignment with the larger sprocket 93 on the counter shaft. The clutch drum 95 is adapted to be driven from the shaft by a clutch shoe mechanism 97 identical with that of the clutch drum 29 and actuated by the sleeve 46 (heretofore described), the actuating levers of the clutch being connected with the end of the sleeve opposite the clutch drum 29 by links complementary to the links 47 so that when the sleeve is shifted outwardly on the shaft, the clutch shoe mechanism 97 engages the drum and drives the drum therewith at the speed of the shaft, and causes the sprocket 96 on the drum to drive the gear 93 on the counter shaft through a chain 98 running over the sprockets.

Bolted to the web of the clutch drum 29 and resting on an offset shoulder 99 in the web is a sprocket 100 located in alignment with the smaller sprocket 94 on the counter shaft and driven therefrom by a chain 101 running over the sprockets to drive the pulley, the sprockets being of such size as to drive the pulley at a speed less than the speed of the shaft, giving the low speed for the transmission.

Attention is called to the fact that while the pulley is being driven at low speed the bevel pinions 73 act as differentials to compensate for the difference of speed between the gear 65 which is keyed directly to the shaft and the speed of the gear 64 which is fixed to the pulley.

In operating a transmission constructed as described, the engine may be run at its rated speed and a pulley speed suitable to the requirements of the load can be obtained by shifting the rod 56 rearwardly to engage the clutch drum for driving the pulley at low speed through the counter shaft or the rod may be moved forwardly to cause engagement of the clutch drum 30 for driving the pulley at high speed. Or the rod may be shifted to move the sleeve to neutral position so that neither drum is engaged and then the rod 80 may be shifted forwardly to tighten the brake band on the planetary gear carrier, causing the pulley to be driven reversely and at the same speed as the shaft.

Thus it is apparent that we have provided a reverse clutch pulley with high and low speeds forward so that the various speeds may be selected in an efficient and expeditious manner to suit the conditions of the working load, and at the same time running the engine within its normal speed range.

What we claim and desire to secure by Letters Patent is:

1. In a device of the class described, a power shaft, a pulley loosely mounted on the power shaft, clutch mechanism connecting the power shaft with the pulley to drive the pulley at the speed of the power shaft, a sprocket wheel loose on the power shaft, a counter shaft, a sprocket wheel fixed on the counter shaft and driven from the sprocket wheel on the power shaft, a second sprocket wheel fixed on the counter shaft, a sprocket wheel fixed on the pulley driven from the last named sprocket wheel, and a clutch for connecting the first named sprocket wheel to the power shaft.

2. In a device of the character described, a power shaft, a reverse clutch pulley on the shaft, a counter shaft, aligning sprockets on the respective shafts, one of the sprockets being loose on its shaft, a chain belt running over the sprockets, a sprocket on the clutch pulley, a sprocket on the counter shaft aligning with the sprocket on the clutch pulley, a chain running over the last named sprockets to drive the reverse clutch pulley from the counter shaft, and a clutch for engaging the loose sprocket to drive the counter shaft.

3. In a device of the character described, a power shaft, a reverse clutch pulley on the shaft, a counter shaft, a drive member on the power shaft, an aligning driven member on the counter shaft actuated by the drive member, one of the said members being loose on its shaft and the other fixed to its shaft, a driven member on the reverse clutch pulley, an aligning drive member on the counter shaft for driving the driven member on the pulley, and a clutch for engaging the loose member to drive the counter shaft.

In testimony whereof we affix our signatures.

SAMUEL B. GOLD.
BRUCE E. GOLD.